Feb. 18, 1969   N. A. KUEBLER ET AL   3,428,388
LAYERED STRUCTURE ULTRAVIOLET POLARIZER
Filed Sept. 29, 1965    Sheet 1 of 2
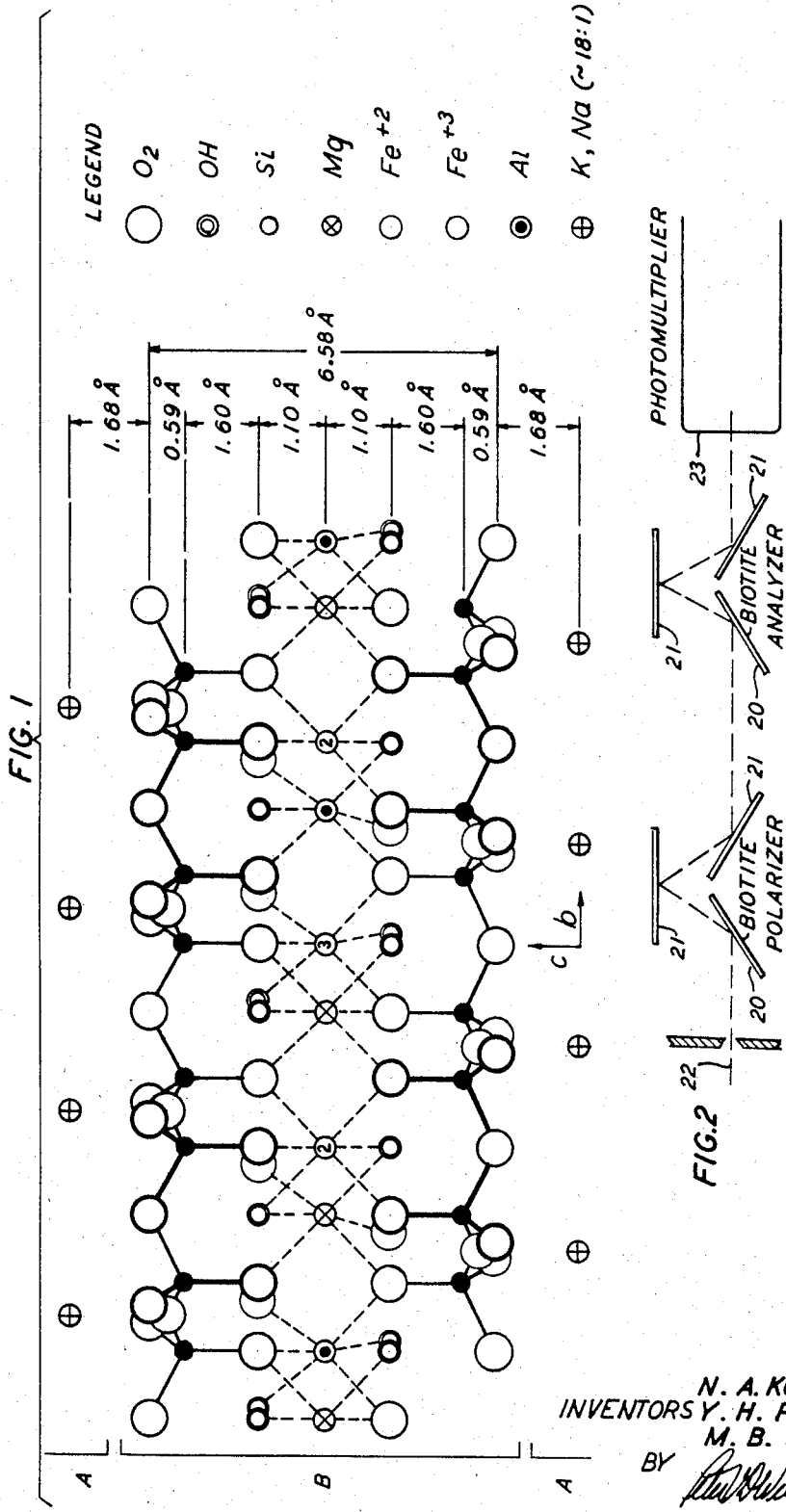
INVENTORS
N. A. KUEBLER
Y. H. PAO
M. B. ROBIN
BY
ATTORNEY

3,428,388
LAYERED STRUCTURE ULTRAVIOLET POLARIZER

Norman A. Kuebler, Irvington, Yoh-Han Pao, Chatham, and Melvin B. Robin, Warren Township, Somerset County, N.J., assignors to Bell Telephone Laboratories, Incorporated, New York, N.Y., a corporation of New York
Filed Sept. 29, 1965, Ser. No. 491,344
U.S. Cl. 350—152     3 Claims
Int. Cl. G02b 5/30, 13/14, 27/28

This invention relates to light polarizers particularly adapted for use with ultraviolet radiation.

It has been found that biotite, a naturally occurring, iron-rich, silicate mineral, performs unexpectedly well as a Brewster angle reflection polarizer over the range of light frequencies from 6000 A. to 1000 A. and is particularly useful in the range 4000 A. to 1000 A. An analysis of the biotite structure suggests that other naturally occurring materials and synthetic structures having the requisite optical anisotropy as hereinafter defined are exceptionally effective as light polarizers and are particularly advantageous at ultraviolet frequencies where efficient large aperture polarizers are virtually nonexistent.

The structure upon which the polarizer is based as well as other aspects of the invention will be more apparent from the following detailed description. In the drawing:

FIG. 1 is a diagrammatic representation of the atomic structural scheme of biotite;

FIG. 2 is a schematic array of an apparatus for demonstrating the polarizing effects of a structure of the invention;

Figure 3A:
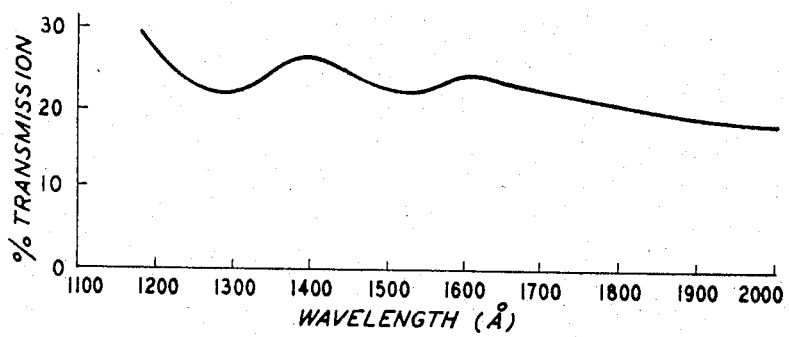
FIG. 3A is a plot of wavelength versus percent transmission for a typical polarizer sample according to the invention.
Figure 3B:
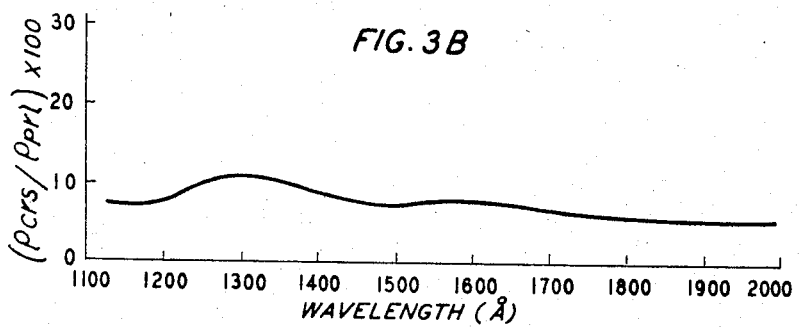
Figure 4:
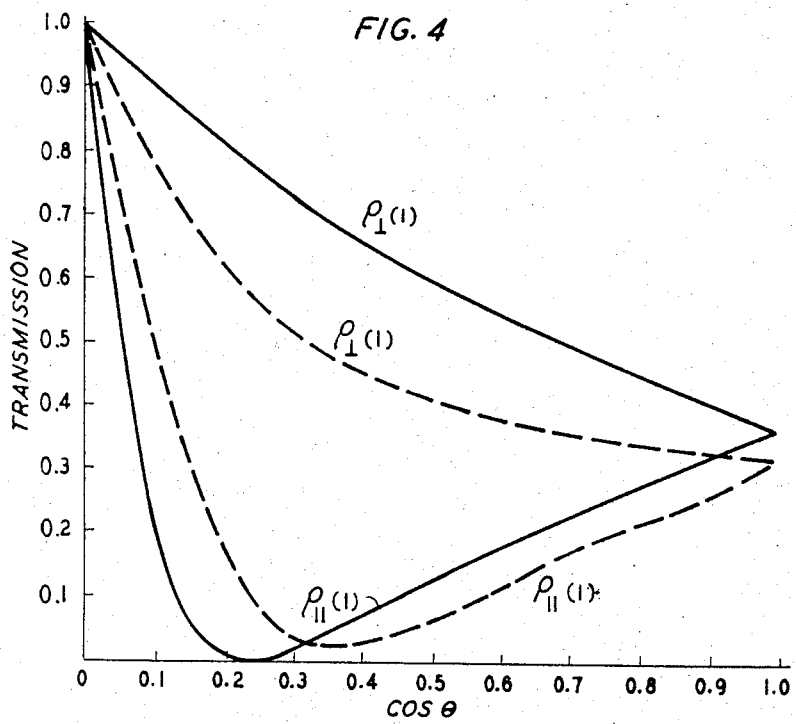

FIG. 3B is a plot of wavelength versus the ratio of the light transmitted with crossed polarizers to the light transmitted with aligned polarizers, a measure of the efficiency of the polarizer; and FIG. 4 is a plot of wavelength versus the reflectances where the quantity $\rho_\perp$ is the ratio of the intensity of the reflected light to that of the incident light, the electric vector being perpendicular to the plane of incidence and $\rho_\parallel$ is the ratio of reflected to incident light when the electric vector is parallel to the plane of incidence.

The mineral biotite is similar to mica except that some of the aluminum ions of the mica structure are substituted by $Mg^{+2}$, $Fe^{+2}$ and $Fe^{+3}$ ions. The atomic structure is shown schematically in FIG. 1. Certain O and OH atoms which would otherwise be superimposed in the figure have been slightly displaced for clarity. The essential feature of this material is its striated or layered atomic structure. The silicate tetrahedra characteristic of this class of minerals form in a hexagonal sheet in the (001) plane. The vertex oxygen atom of each tetrahedron projects out of the hexagonal plane in a common direction. Two such sheets are joined face to face at the vertex oxygen atoms. There is room inside each ring, formed by the vertex oxygen atoms, for a hydroxyl atom as shown in FIG. 1. The lower oxygen atoms and hydroxyl groups together form a close-packed layer, with atoms at the corners of equilateral triangles. This close-packed layer fits into the similar layer of the opposite network.

These two layers provide places for magnesium or iron atoms in six coordination. The idealized unit cell for biotite has the formula $K(MgFe)_3(AlSi_3O_{10}) \cdot (OH)_2$. There are approximately six valence positions in six coordination in the unit cell so that to the extent that trivalent iron is substituted the number of atoms accommodated is reduced. A typical biotite average unit cell composition possesses 0.4 atom $Fe^{+3}$, 0.8 atom $Fe^{+2}$ and 1.5 atoms $Mg^{+2}$ with a small amount of titanium (~0.1 atom). The usual compositional variations will be encountered depending upon the geology of the sample. It is essential for the purposes of this invention that the sample contain a significant portion of substituted iron for the reason which will now be explained.

A reflection or Brewster angle polarizer requires a highly nonabsorbing dielectric surface to polarize efficiently. It is well known that materials which possess this property characteristically have low reflectivity and further, that highly reflective materials polarize very inefficiently. Since no materials heretofore known possess both desirable properties, it has been necessary to compromise the polarizer's better quality, usually its high polarization efficiency, with its bad property, high loss.

Materials having the structure according to this invention exhibit both desirable characteristics, i.e., high polarization efficiency, and low reflection loss. This is attributable to the layered structure illustrated in FIG. 1. The substituted ions are held in layer B in FIG. 1 so that the B layers and consequently the composite layered structure are highly anisotropic optically. For a light beam incident on the surface at an angle, the component with the electric vector parallel to the plane of incidence (and therefore nearly perpendicular to the layered surfaces) "sees" essentially a lateral cross section of the A and B layers. Both layers behave as dielectric layers and at an appropriate angle it is possible to suppress reflection. However, the component of light with the electric vector perpendicular to the plane of incidence and parallel to the layered surfaces always "sees" the highly absorbing and therefore highly reflecting A layers and is reflected efficiently. The B layers do not impede this reflection since they act as a dielectric. This results in a highly polarized light beam. If several such layers are provided these effects are multiplied to an extent whereby the overall polarization may be as high as 97 percent with a transmission of nearly 70 percent.

It is apparent from FIG. 1 that the physical dimensions of the discrete layers A and B are very small. The function of the layered structure is to secure highly anisotropic absorbing (and hence reflectory) properties in at least one of the different types of layers. This may either be done by anchoring the $Fe^{+2}$ and $Fe^{+3}$ ions in a planar array so that resonance between the different valences results in high absorption in the plane of the layer or any other similar effect. To secure optical anisotropy, these planes preferably should not be closer than 6 A. and to secure maximum efficiency they preferably should not be more than 15 A. apart. Planar irregularities should be less than ±2 A. over a 10 A. distance. The dielectric layer should be as transparent as possible at normal incidence (more than 95 percent). The reflecting layer should have absorption of at least ten times the dielectric layer. The effective number of layers required can vary substantially. Since this polarizer is based upon a reflection phenomenon the thickness of the polarizer depends essentially upon the depth to which the light penetrates. For instance in a highly transparent medium where the dielectric layers transmit 99.9 percent of the radiation and the reflecting layers transmit 98.9 percent (ten times less), at a depth of 100 double layers, 70 percent of the light has been reflected. Since the reflection per layer remains essentially constant the increase in reflected light is an exponential function of the polarizer thickness so that to recover close to 100 percent of the light requires considerably greater numbers of layers. If the structure is to be synthetic it may be more desirable to increase the amount of incident light rather than to increase the over-all reflection at the expense of greater numbers of layers. In the case of biotite samples are easily obtainable having thicknesses of several mils which contain of the order of 105 double layers and no problem arises. However it is realistic to prescribe a minimum number of layers to obtain a useful effect. If the reflecting layer is quite highly absorbing (i.e., 50 percent transmitting) then obviously only a few layers will be utilized since the amount of the original light beam transmitted falls below 10 percent after the fourth reflective layer (eighth layer). However, if the reflecting layer is less absorbing (90 percent transmitting) the twentieth reflective layer (fortieth layer) still passes over 10 percent of the original light. Consequently, it is only necessary to prescribe a minimum of at least four alternate dielectric-reflecting layers (eight layers).

The precision with which nature provides this structure in a mineral such as biotite is indeed remarkable. Equivalent synthetic structures within the ranges prescribed will be a challenge to the best of modern technology to produce. Thin film techniques are progressing rapidly so that it may be practical to fabricate the polarizer structure described here by high vacuum evaporation, cathodic sputtering or similar techniques.

This invention is directed to a polarizer structure and all similar structures, whether naturally occurring or synthetically produced, used for the purposes through which the unexpected advantages described herein can be realized are considered within the scope of the invention.

To demonstrate the operation of a polarizer having the structure prescribed above, samples of biotite were prepared by simply cleaving the mineral along the mica-like layers. The materials cleave very precisely along the weak bonds between the alkali atoms and the adjacent oxygen atoms. The double silicate sheets are bonded very strongly. Consequently, since the original structure is so perfect and the cleavage dependably precise, the sheets of biotite are almost atomically smooth and represent a finished optical polarizer. Many of the cleaved layers are as large as three inches square. It will be appreciated that the manufacture of large aperture polarizes from naturally occurring materials according to this invention is exceptionally simple.

A polarizer-analyzer combination was constructed as shown in FIG. 2 using a 61° Brewster angle reflection off ¾ inch x ¾ inch x 0.003 inch biotite plates 20 as the polarizing and analyzing elements and pairs of front surface aluminized, $MgF_2$ coated mirrors 21 for the return of the light beam from the slit 22 to the photomultiplier 23. A biotite structure of this dimension effectively utilizes about ten dielectric layers having approximately 99.5 percent transmission and ten reflecting layers having approximately 94 percent transmission. This is the effective reflecting surface for 70 percent of the radiation. In order to obtain a rough measure of the optical constants of biotite, a second polarizer was constructed and tested with 10° angle of incidence.

Orientation of the polarizer-analyzer pair as shown in FIG. 2 is taken as the "parallel" position, whereas rotation of the analyzer by 90° about the AB line "crosses" the polarizer-analyzer pair. When the electric vector is in the plane of incidence, the ratio of the intensity of the reflected light to that of the incident light is defined to be $$\rho_{\parallel} = \frac{R_\parallel}{I_\parallel}$$

for a single reflecting surface. Similarly, when the electric vector is perpendicular to the plane of incidence, the quantity of interest is $$\rho_\perp = \frac{R_\perp}{I_\perp}$$

The object of polarization by Brewster angle reflection is to maintain a high value of $\rho_\perp$ while reducing $\rho_\parallel$ to as close to zero as possible. In a polarizer-analyzer pair, the "parallel" position of the two biotite surfaces refers to the relative arrangement allowing a maximum transmission of $R_\perp$, the desired component. That is, R from the first surface acts as $I_\perp$ for the second. In contrast to this, in the "crossed" arrangement, $R_\perp$ from the first acts as $I_\parallel$ for the second.

Using the experimental arrangement shown schematically in FIG. 2, but without the analyzer, the percentage of the incident light intensity transmitted by a single polarizer as a function of wavelength was determined. This curve, after correction for the attenuation due to losses at the mirrors, is given in FIG. 3A. The ratio of the percentage transmission in the crossed $\rho_{\text{crs}}$ to the parallel $\rho_{\text{prl}}$ polarizer-analyzer positions is shown in FIG. 3B. With some biotite samples, this latter ratio was as low as 0.04 to 0.05 in the far UV region. In the visible region, it is possible to use a Polaroid polarizing film as the analyzer instead of a second biotite reflection, and in this way, the reflectance and polarizance of a single biotite may be measured directly instead of inferred. Good agreement was obtained between the sets of data determined in the two different ways.

Theoretically, the reflectance of an absorbing material may be calculated by allowing the refractive index to be complex, $n = n(1-ik)$, and the reflectances then can be derived to be:

$$\rho_\perp = \frac{(\beta-u)^2+v^2}{(\beta+u)^2+v^2} \quad (1)$$

$$\rho_\parallel = \frac{n^2(1+k^2)\beta^2 - \beta\left\{\frac{2(1-k^2)u+4kv}{(1+k^2)}\right\} + \frac{u^2+v^2}{n^2(1+k^2)}}{n^2(1+k^2)\beta^2 + \beta\left\{\frac{2(1-k^2)u+4kv}{(1+k^2)}\right\} + \frac{u^2+v^2}{n^2(1+k^2)}} \quad (2)$$

where $$2u^2 = n^2(1-k^2) - (1-\beta^2) + \{[n^2(1-k^2)-(1-\beta^2)]^2 + 4n^4k^2\}^{\frac{1}{2}} \quad (3)$$

and $$2v^2 = -[n^2(1-k^2)-(1-\beta^2)] + \{[n^2(1-k^2)-(1-\beta^2)]^2 + 4n^4k^2\}^{\frac{1}{2}} \quad (4)$$

In Equations 1 through 4, the refractive index of air is taken to be unity and $\beta = \cos\theta$, where $\theta$ is the angle of incidence measured from the normal of the reflecting plane. The $n$ and $k$ are the refractive index and absorption coefficient, respectively, of the reflecting medium.

For illustration, we show in FIG. 4, how the values of $\rho_\perp$ and $\rho_\parallel$ depend upon $\cos\theta$ at an incident wavelength of 1361 A. This is to be compared with the plot of $\rho_\perp$ and $\rho_\parallel$ versus $\cos\theta$ given by Equations 1 and 2 for the best fit values, $n=4.0$, $k=0.1$. We see from this that the behavior of biotite is anomalous not only in that the angular dependence does not agree with that given by Equations 1 and 2, but also because the data lead to a most unlikely combination of the optical constants. The value $n=4.0$ implies that there is a region of strong absorption very near 1361 A. in biotite, whereas $k=0.1$ implies that the absorption at 1361 A. is very weak.

This anomaly is resolved when we realize that $k$ as well as $n$ can be different in different directions. Investigations of the visible absorption spectrum of biotite in polarized light reveals that $k$ is large within the layered planes but much smaller perpendicular to these planes. Modification of Equations 1 and 2 to accommodate these anisotropic conditions reveals that the anomalous property of high reflectivity simultaneous with high polarization is present.

What is claimed is:

1. A light polarizer useful in the light frequency range of 6000 A. to 1000 A. comprising a structure having at least eight alternate layers of a dielectric material having a light transmission over a portion of the aforementioned light frequency range of at least 90 percent and a reflecting material having a light transmission over the same portion of said light range in the range of at least ten times less than the transmission of the dielectric layer, each of said layers having a thickness of 5 A. to 15 A. and a thickness uniformity of ±2 A. over a distance of 10 A., and means for directing a light beam having a light frequency in the aforesaid portion of the light frequency range onto the plane of said polarizing structure at approximately the Brewster angle of the structure.

2. The polarizer of claim 1 in which the structure comprises a mica structure.

3. The polarizer of claim 1 in which the structure comprises biotite.

References Cited

R. S. Sokolova and T. N. Krylova, "Interference Polarizers for the Ultraviolet Spectral Region," Optics and Spectroscopy, vol. XIV, No. 3, March 1963, pp. 213–215.

DAVID SCHONBERG, *Primary Examiner.*

PAUL R. MILLER, *Assistant Examiner.*

U.S. Cl. X.R.

350—1, 147